(12) United States Patent
O'Dell

(10) Patent No.: US 7,669,122 B2
(45) Date of Patent: Feb. 23, 2010

(54) USING INPUT OF RHYMING CHARACTERS FOR COMPUTER TEXT ENTRY OF CHINESE CHARACTERS

(76) Inventor: Robert Barry O'Dell, 602 Calmar Ave., Oakland, CA (US) 94610

( * ) Notice: Subject to any disclaimer, the term of this patent is extended or adjusted under 35 U.S.C. 154(b) by 0 days.

(21) Appl. No.: 11/986,178

(22) Filed: Nov. 19, 2007

(65) Prior Publication Data

US 2009/0132231 A1 May 21, 2009

(51) Int. Cl.
*G06F 17/21* (2006.01)
*G06F 17/27* (2006.01)

(52) U.S. Cl. .............................. 715/263; 715/262; 704/9
(58) Field of Classification Search ....................... None
See application file for complete search history.

(56) References Cited

U.S. PATENT DOCUMENTS 4,937,745 A * 6/1990 Carmon ...................... 715/264
6,801,659 B1 * 10/2004 O'Dell ........................ 382/185
6,810,504 B2 * 10/2004 Cooper et al. ............... 715/263
2004/0186705 A1 * 9/2004 Morgan et al. ................. 704/9

* cited by examiner

*Primary Examiner*—Talivaldis Ivars Smits
*Assistant Examiner*—Samuel G Neway

(57) ABSTRACT

As either regular entry or as an assist to the user of existing computer text entry systems, the invention makes possible an alternative method of Chinese character entry by entering a Chinese character assumed by the user to be a rhyme of the character the user desires to enter. Entry methods for such rhyme alternative entry include phonetic and non-phonetic entry of Chinese characters, including keyboard stroke-category input, and handwritten entry using an electronic surface. The invention is not only helpful for entry of difficult Chinese characters but provides an approach to the use of supplementing input methods for most if not all written languages.

18 Claims, 5 Drawing Sheets

USING INPUT OF RHYMING CHARACTERS FOR COMPUTER TEXT ENTRY OF CHINESE CHARACTERS

FIELD OF THE INVENTION

Computer text entry, and, more particularly, methods of input of Chinese characters.

BACKGROUND OF THE INVENTION

The average student in China is said to know about 3500 characters when the student leaves secondary school. For those educated beyond the secondary school level the numbers are said to be significantly higher. But many people, even the best educated, find that sometimes they can not call to mind the exact look of a character even though they recognize it easily when they see it in print.

Not surprisingly, then, a continuing problem for even the most competent users of computer text-entry methods for Chinese is that they sometimes find themselves at a loss when trying to enter a character with non-phonetic entry methods, including keyboard entry and handwriting on an electronic pad or screen. Another barrier to such non-phonetic character entry is that the user sometimes forgets not only the look of the character but the standard stroke order of the character; each of these problems not only creates difficulties for handwriting input on an electronic pad or screen but also for non-phonetic keyboard entry. Another issue for handwriting recognition is that since handwriting recognition software is based on statistical data gained from a sample of possible users, the user of handwriting recognition programs not only can have the problem of not remembering the look of the character or the stroke order, but also may find that the computer does not recognize the entry simply because of the user's handwriting style. And handwriting acceptance by the recognition program usually will vary from character to character for an individual user.

Partly because of such problems with non-phonetic character entry, phonetic keyboard entry remains the character entry method most commonly used.

But neither are phonetic entry methods immune to character entry problems. Pinyin, a method of using Western alphabet to spell out the sounds of Chinese characters, is taught in virtually all of China's elementary schools. But many fail to master Pinyin so completely as to have great confidence in its use. Pinyin spelling is sometimes forgotten just when a user needs to input the character. This is especially true for those whose native tongue is not Beijing Mandarin (referred to also as Putonghua—'the common language', which is the standard taught in the schools) but another dialect of Chinese. It can also create difficulties for those whose native language is Mandarin but whose local pronunciation differs from Beijing Mandarin (the Putonghua standard) as much as does that between speakers of U.S. English in New England and Alabama. Yet another problem for phonetic character entry is that obviously neither Pinyin nor any other phonetic input method can be used to enter characters which the user cannot pronounce, a problem that can result both with unfamiliar characters as well as from common variations in pronunciation.

When the user's pronunciation of the needed character is not standard, or the user needs to input an unfamiliar character the difficulty of phonetic input often causes the user to turn to non-phonetic entry of the character, which as noted heretofore presents problems of its own.

Many methods of Chinese character input have a steep learning curve—which varies for each user—and all entry methods are imperfect. What is needed is a simple alternative method of text input which will allow a user to more easily input characters that the user can neither spell nor pronounce in standard Putonghua, and/or cannot visualize, and/or has forgotten the stroke order of, and/or has difficulty writing clearly on an electronic pad. Not only would this provide help to users of phonetic text input, it also would enhance the appeal of non-phonetic character input. Since the beginning of computer entry of Chinese characters several decades ago, difficulty with character image recall has been a significant barrier to widespread adoption of non-phonetic input methods, and continues to be so today.

SUMMARY OF THE INVENTION

The computer-implemented text entry method disclosed herein allows the user to base Chinese text entry on pronunciation without requiring any knowledge of phonetics. Rather than directly entering a desired Chinese character, the user enters an alternative character that rhymes with the desired character. After input of the alternative rhyming character causes the display of the alternative rhyming character, the user selects the entered alternative rhyming character, then indicates that the entry is an alternative rhyming entry, rather than the desired entry. The user's indication that the entry is an alternative rhyming entry causes the display of index characters that rhyme with the entered alternative rhyming character and represent groups of one or more homophones that rhyme both with the entered alternative character and with the desired character. Unless the desired character happens to be one of the index characters displayed, the user selects from the display of index characters the index character that is a homophone of the desired character. This selection of an index character causes a display of homophones of the index character, among which is included the desired character. The user then selects the desired character and sends it to the text line. If the desired character is not displayed, the user then asks for a display of non-standard-rhymes.

Except for the indication that the entry is alternative rhyme entry rather than the usual entry of a desired character, the entry of the alternative rhyming character is the same as it would be if it were being entered directly as the desired character.

Rhyming characters herein are characters that rhyme as they are pronounced in Putonghua, including the tone used in Putonghua.

In another embodiment the invention makes possible the use of rhymes of Chinese dialects other than Mandarin, including Wu, Yue (Cantonese), Hakka, Xiang, Min and Gan. A user whose native tongue is Yue and who does not have complete confidence in his Putonghua uses Yue rhymes by following an alternative rhyming character entry with an indication that it was not a Putonghua rhyme that was entered but a Yue rhyme, and Yue rhymes will be displayed for selection.

In an embodiment which includes entry of alternative multi-character rhymes—including multi-character words and phrases—rather than the desired multi-character word or phrase, an indication that entry is alternative rhyming entry is made before entry of the second and each subsequent character in the word or phrase.

In another embodiment the indication of alternative rhyme entry is made prior to beginning entry of the alternative rhyming character rather than after entry has identified the alternative rhyming character.

The invention can be used with any of various computer-implemented text entry input methods, including both full and reduced keyboards, keypads and handwriting on an electronic screen or pad, and is useful for entry of any language with rhymes, including alphabetic languages.

The invention provides an alternative character entry method as a supplement to the various methods of character entry, but it is also useful as a primary means of entry for some or all character entry. In order to increase text entry speed and reduce frustration, an experienced user may decide to use alternative rhyming entry as the usual entry method for characters which the user finds slow or difficult to input.

A BRIEF DESCRIPTION OF THE DRAWINGS

DETAILED DESCRIPTION OF THE INVENTION

Figure 1:
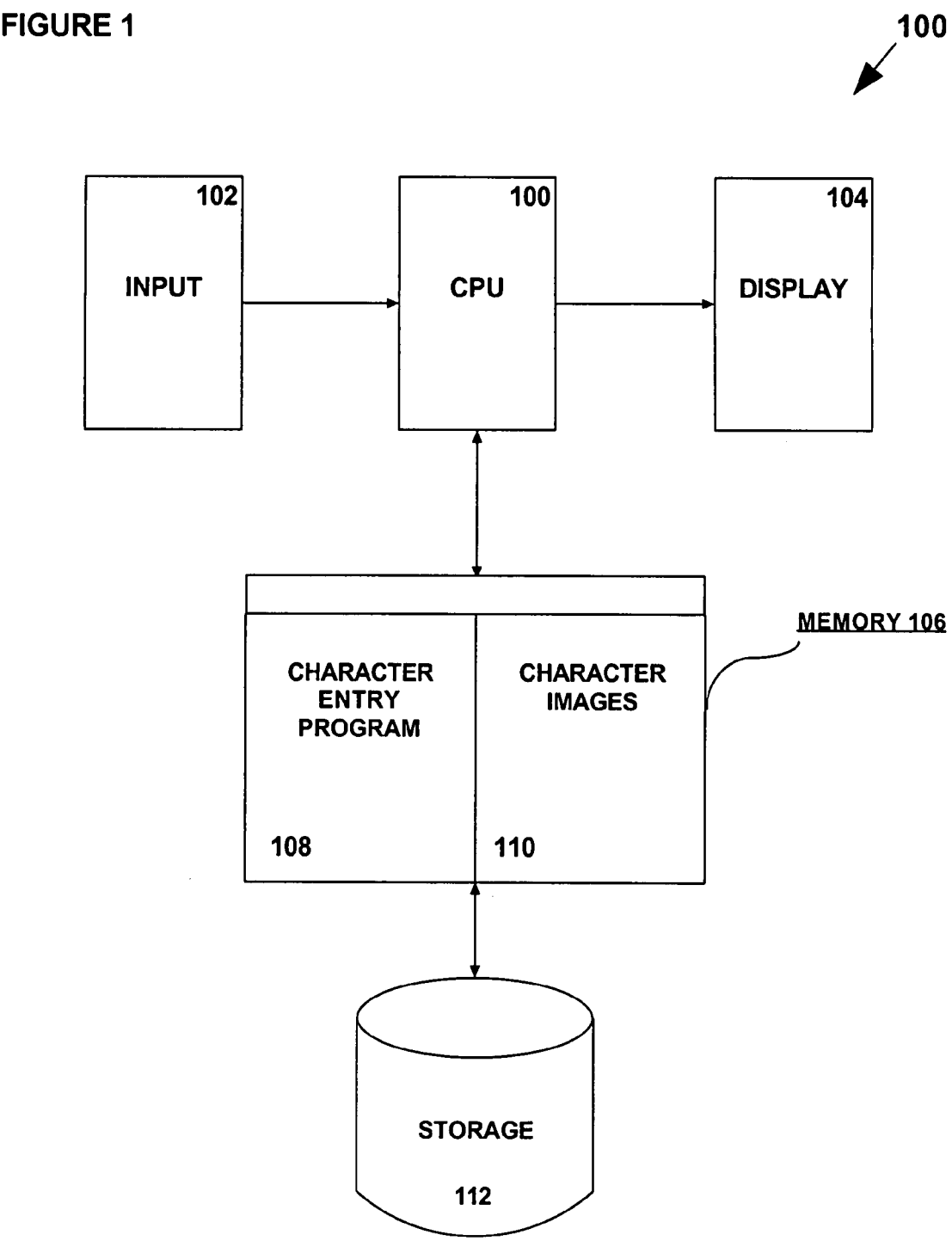
FIG. 1 is a block diagram of a computer apparatus for utilizing an encoding system using input of alternative rhyming characters to access Chinese characters as an alternative to regular entry in accordance with the invention.

Chinese words are made up of one or more characters. The characters are considered to be single syllables, whose pronunciation is made up of an initial sound and a final sound. For example the character for tree [木],whose pronunciation is rendered in Putonghua as mù, has an initial 'm' sound and a final 'ù' sound. In Putonghua (the common language taught in China's schools) a character is said to be pronounced with one of four tones: flat, rising, falling then rising, or falling. For characters whose final sound is represented by the Pinyin letter 'u', for example, these tones are graphically represented respectively as ū, ú, ǔ, and ù. A Chinese rhyming character is referred to herein as a character that has exactly the same Putonghua 'final' sound as one or more other characters.

Putonghua has a great many character rhymes. Every character among the 5000 most frequently used characters appears to have at least several rhymes. All but a few characters have many rhymes. For example, there are dozens of characters among the 5000 most frequently used characters which rhyme with any character pronounced mū. All of the rhyming characters have the same final sound, while all but the homophones among them have a different initial sound.

The invention's method of alternative rhyming entry of Chinese characters creates the opportunity of the entry of non-phonetic input of a more familiar character rather than the desired character with the result that the computer displays all characters rhyming with the desired character so that the user can enter a desired character without having to input the desired character. In an English analogy, if a user could not remember how to spell 'naught' the user could input the word 'caught', and, after entry of the word 'caught' and a request for a display of rhymes of the word 'caught', see a display which included the desired word, 'naught'. The method is also useful for entry of multi-character rhymes and entry of 'non-standard rhymes'—characters which are assumed by some users to be rhymes, but do not rhyme in standard Putonghua pronunciation.

This alternative rhyming entry helps the user of a Chinese character non-phonetic input method who has forgotten for the moment the exact appearance of the desired character's image, or is confused—at least momentarily—about the desired character's stroke order.

U.S. Pat. No. 5,109,352—O'Dell is incorporated herein in its entirety by reference and is referred to herein as the '352 patent. In one embodiment the present invention is applied to the character input method of the '352 patent. The '352 patent uses a computer-implemented stroke-input method for calling out the display of a desired character; this stroke input method uses a reduced keyboard which assigns each of five different keys to a separate category of the Chinese government-approved five stroke categories: vertical strokes, horizontal strokes, strokes drawn down to the right, strokes drawn down to the left, and strokes with one or more 'turning points' or 'corners'. These five categories embrace all strokes used to make Chinese characters. Such a use of five stroke-category keys is seen in the present invention, where, in FIG. 3, five stroke-category keys numbered 1-5 on the reduced keyboard are designated 302-310.

All Chinese characters are shown herein with brackets.

Figure 3:
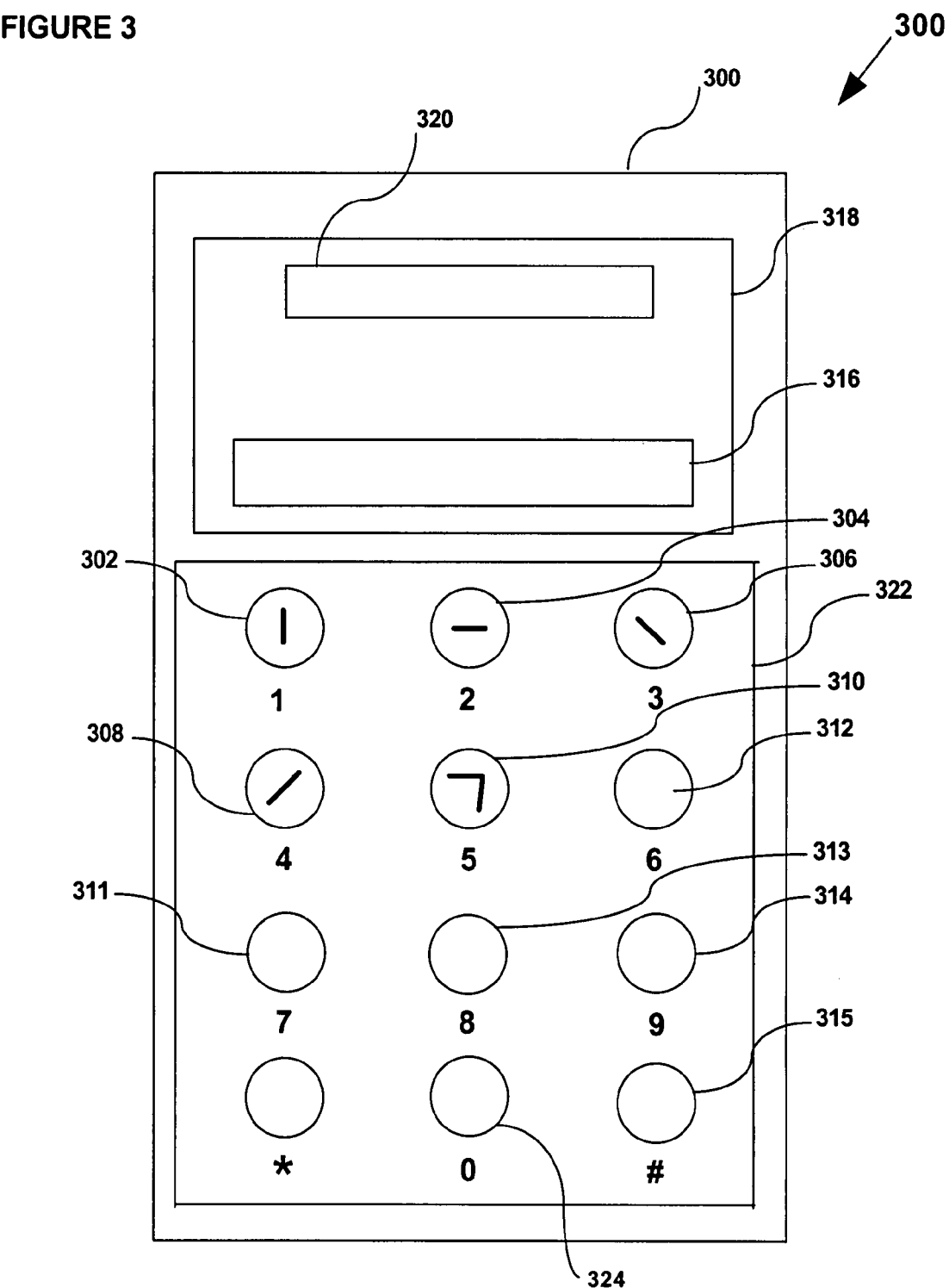
FIG. 3 is an illustration of a reduced keyboard used for stroke-entry of Chinese characters, showing stroke categories on five of its twelve keys.

In order to input the character for 'tree' [木],using the stroke-input method of the '352 patent with reduced keyboard 324 of mobile phone 322 in FIG. 3, the user presses the appropriate stroke category keys in the same sequence with which the strokes are laid down in the traditional taught order when making the character with pen, pencil or brush. To call out the display of the character for 'tree', [木],the user, needing to enter the key press sequence 21436, presses 304 (the 2 key) for the first (horizontal) stroke, then 302 (the 1 key) for the second (vertical) stroke, 308 (the 4 key) for the third (down-left) stroke, 306 (the 3 key) for the fourth (down-right) last stroke, and finishes with a press of (the 6 key), 312, to indicate that input is complete. (This last key-press of (the 6-key), 312, is necessary because the character for 'tree' [木],is the beginning element of other, more complex characters, and many other characters also begin with the same four key-press sequence.) The input string sequence is listed among the input strings in the database and results from the sequence of key presses, which for 'tree' [木],is 21436.

Using Rhyming Index Characters and Homophones of the Desired Character

The invention's alternative rhyming character entry method allows the user to base character entry on the pronunciation of the character without requiring a knowledge of phonetics, thereby providing an alternative method of entry which is useful as a supplement to any method of Chinese text input. Rather than using direct methods of character entry, including methods used with a keyboard, soft keypad or with cursive or semi-cursive written entry of the desired Chinese character, the user enters the desired Chinese character by entry of a character that is a rhyme of the desired character. Using this alternative rhyming input method brings a display of what are referred to herein as index characters: one character from each group of characters which rhyme with the desired character, but which—except for one group—share an initial sound that is different from that of the desired character. The index characters rhyme both with the desired character and with the alternative rhyming character that was input. All characters of an indexed group of characters are homophones of each other, and their pronunciation is represented by the index character.

The group whose characters do not share an initial sound that is different from that of the desired character are homophones of the desired character and include the desired character. Unless the desired character happens to appear as one of the index characters displayed after entry of the alternative rhyming character, the user selects a homophone of the desired character from among the alternative rhyming characters displayed. This selection then brings a display of all homophones of the desired character, including the desired character itself, which is then selected and sent to the text line. The number of rhyming index characters displayed after entry of the alternative rhyming character will not exceed 26 for Putonghua and usually is far fewer. The number of homophones of the desired character number, in a very few cases, is, for the 5000 most frequently used characters, thirty or more—as is well known to today's users of phonetic input. But on average about a half dozen homophone characters are displayed, including the desired character, which is selected and sent to the text line. The extent of search of either index characters or homophones is reduced by any of several methods, including frequency of use ranking, known to those skilled in the art.

A Reduced Keyboard Embodiment

FIG. 1 shows a block diagram of a computer configuration with CPU 100, input 102, display 104, storage 112 and memory 106 with character entry program 108 and character images 110. This computer configuration allows entry of rhymes as an alternative method of entry of a desired character. In an illustrative example of an embodiment using the computer configuration of FIG. 1, rhymes are used as alternative input to stroke input of the desired character on a reduced keyboard where the user is using the '352 character input method described heretofore and the reduced keyboard of FIG. 3. Input 102 is reduced keyboard 322 of text input device 300, including keys 302, 304, 306, 308, 310, 311, 312, 313, 314, 315 and 324. Display 104 includes display screen 318, with text display area 320 and character selection display area 316.

In this illustrative example of non-phonetic entry the user of the reduced keyboard desires to input the character for 'wife' [妻] whose Putonghua pronunciation is rendered in Pinyin as qī. Unable to recall the image of the character [妻] or, perhaps uncertain of its strokes or stroke sequence or unable to identify the needed stroke categories, the user decides to input the Chinese character 一 whose Putonghua pronunciation is rendered in Pinyin as yī, and, in Putonghua, rhymes with the pronunciation of the desired character [妻]

When inputting as an alternative rhyming character any of the rhymes in the group of characters pronounced the same as the desired character, the input string (the sequence of keypresses) that calls out the display of the entered character is the same as the input string used to enter that same character when its input is regular input. The indication that the character is being input as a rhyming alternative to a different, desired, character is made only after the usual entry is complete.

Figure 2:
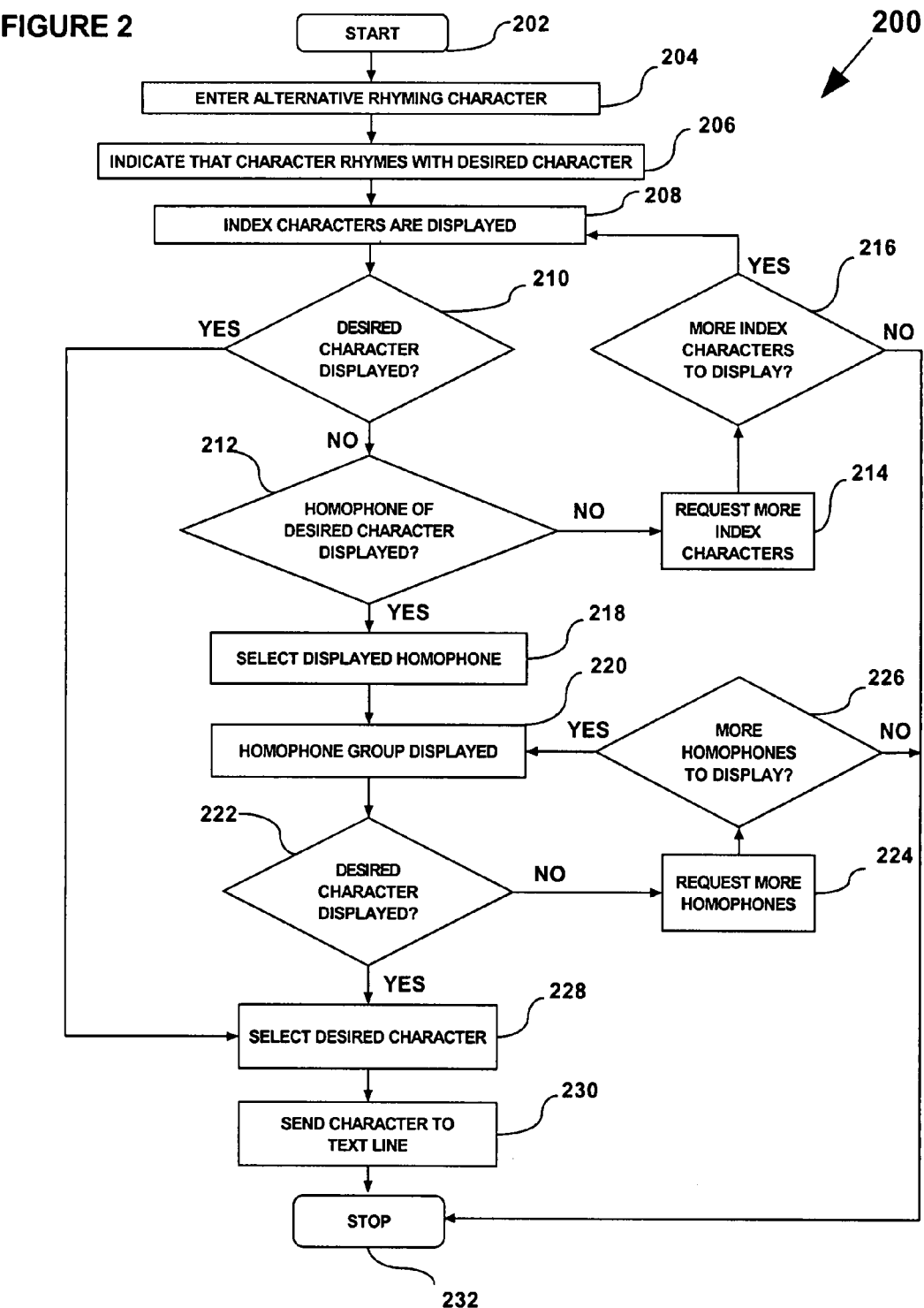
FIG. 2 is a logic flow diagram showing input of an alternative rhyming character to access Chinese characters as a method of entry of Chinese characters in accordance with the invention.

Referring to FIG. 2, the user has loaded memory 106 into CPU 100 from storage 112 at step 202. In step 204, the user uses input device 300 to enter the alternative rhyming character 一 which, in this illustrative example of the embodiment, means pressing keys to enter, in traditional stroke-order sequence, the stroke categories of the alternative rhyming character. Since the alternative rhyming character 一 is comprised of only a single horizontal stroke, it requires only a single press of 304 which is the category key for horizontal strokes. The press of 304 is followed then by a press of the 'end of character input' key 312—key '6'—to indicate an end to stroke-category input. CPU 100 uses character entry program 108 to identify the input as the input for the character 一 and selects the character image from 110 in memory 106. CPU 100 then sends the character image 一 for display at 316 on display screen 318 so that the user can be sure that he has entered the intended alternative rhyming character. Then, in step 206, instead of making a key press that would, in the course of regular input, send the character 一 to text line 320, the user presses 311—the '7' key—which, in step 208, causes the display 104 to display in area 316 one character from each of one or more groups of rhymes that begin with initial sounds that differ from each other. These single characters from each group will be referred to herein as index characters. Each group of the one or more groups that begin with different sounds is comprised of homophones of the index character that represents the group.

Figure 4:
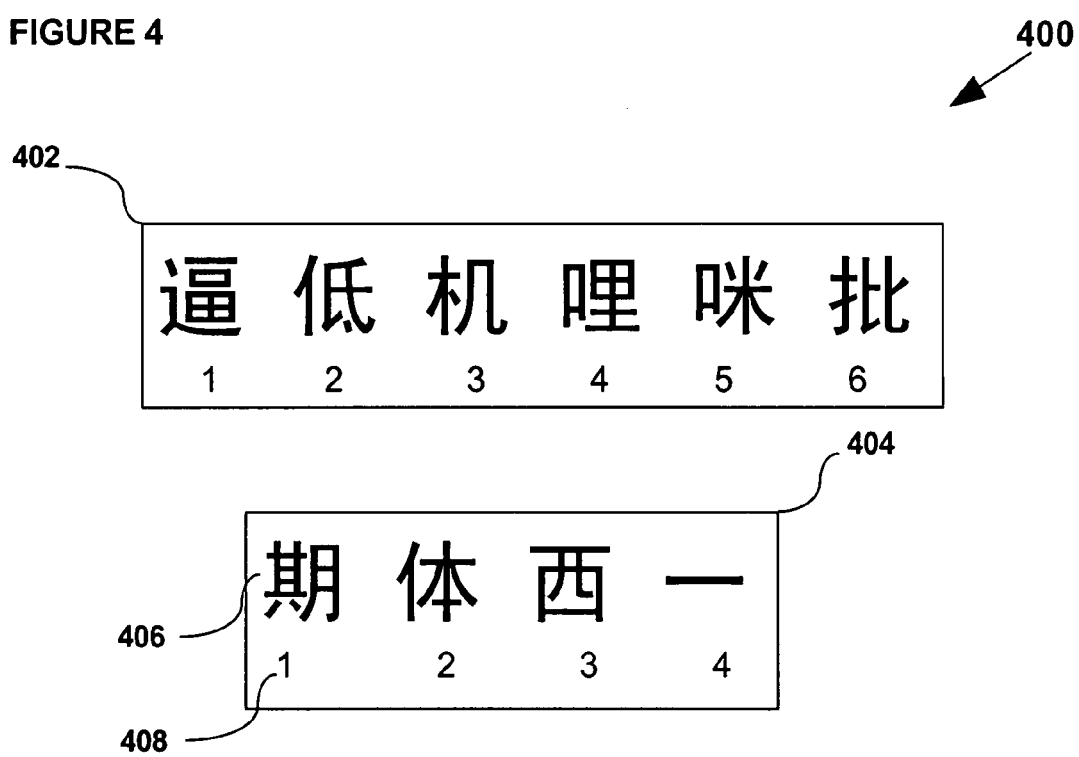
FIG. 4 shows, in accordance with the invention, groups of index characters which, in Putonghua, rhyme both with the desired Chinese character [妻]and the character ⼀, and which are displayed after input of the rhyming character ⼀as an alternative to the input of the character [妻]and any of which is accessed by pressing the associated number key.
Figure 5:
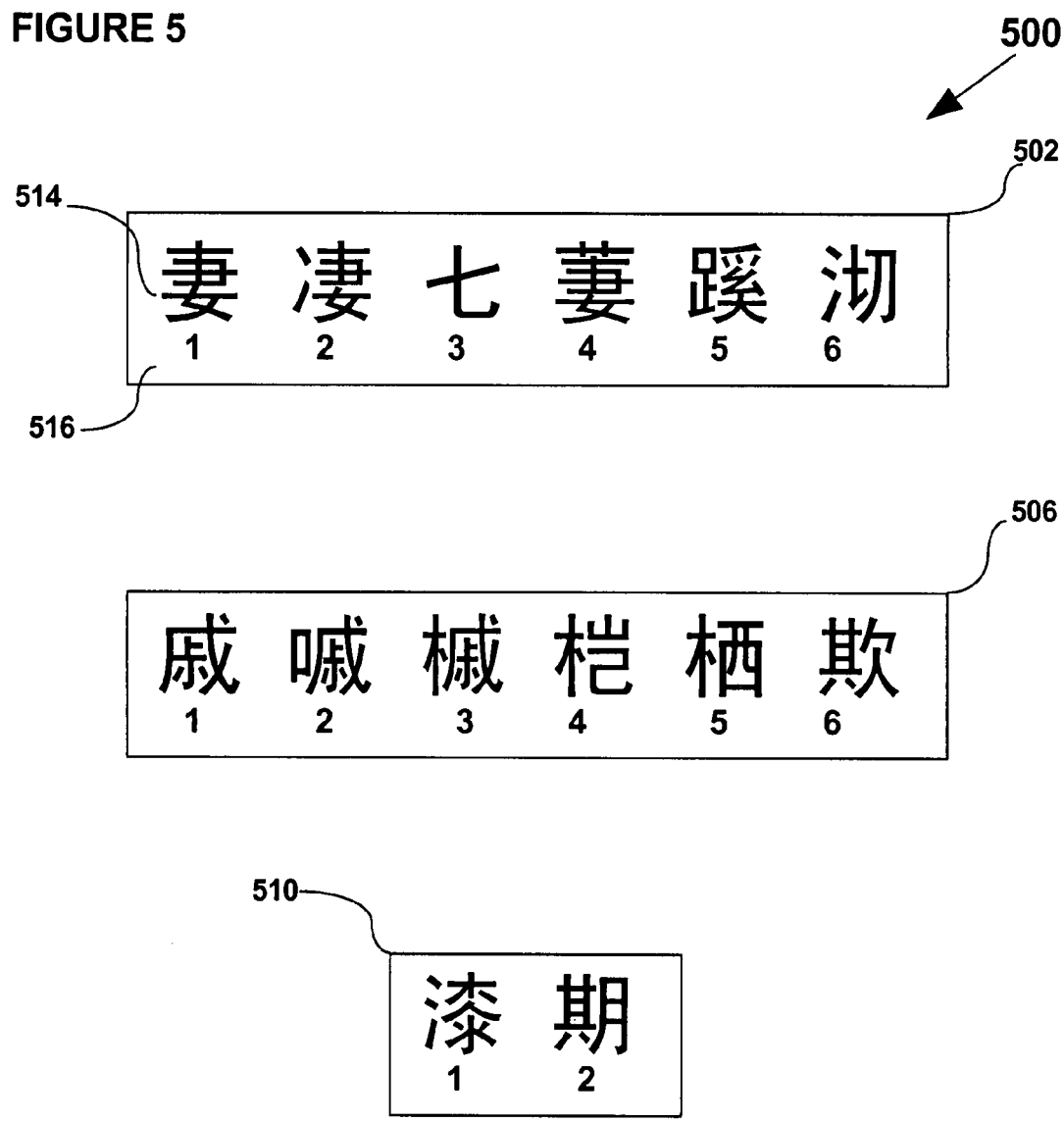
FIG. 5 shows the homophones displayed after selection, by pressing an associated number key, of the index character [期]—a homophone of the desired character [妻]—from the among the rhyming index characters displayed after the input of the alternative rhyming character ⼀in accordance with the invention.

In this illustrative example of the embodiment, the alternative rhyming character 一 which the user has entered not only rhymes with the desired character but happens to be an index character and is displayed in 404 among other index characters. It is not the needed index character, however, since it is not a homophone of the desired character. If, in step 210, the desired character itself is seen as one of the index characters 402 displayed in 316, the user would select the desired character in step 228 and send it to the text line in step 230 and the input process for the desired character would stop in step 232. However, in this illustrative example of the embodiment, the desired character [妻] is, in step 210, not to be seen among the index characters of 402 displayed in display area 316, so the input process moves to step 212, where the user examines the index characters of 402 displayed in 316 for a homophone of the desired character. In step 212, the user sees no homophone of the desired character displayed, so the user then asks in step 214, by pressing the '#-key', 315, whether there are more index characters to be displayed. When it is determined in step 216 that there are indeed more index characters to be displayed, the characters of 404 are displayed in a return to step 208. The new display is examined by the user in step 210 to see whether the desired character [妻] is among index characters 404 now displayed in display area 316. (Had it been determined in step 216 that, instead, there were no more index characters to display, the process would have gone to 232 where it would stop.) It is determined in step 210 that the desired character [妻] is not displayed in 404, and the input process moves again to step 212. In step 212, the user visually examines the display 404 of index characters seen in display area 316 for a homophone of the desired character [妻] and sees that the index character [期] designated 406 in FIG. 4, is a homophone of the desired character [妻] The user now selects in step 218 the character [期] 406 by pressing the '1' key, designated as 408, which causes, in step 220, the display seen in FIG. 5 of all the homophones of the index character [期] which are also homophones of the desired character [妻] The user sees in step 222 that character 514 of homophone group 502 is the desired character [妻]The user then, in step 228, selects the desired character [妻]using the '1-key', which is indicated as 516, and sends the desired character to the text line 320 in step 230 by pressing the '0' key, designated 315. Entry is now complete and stops at step 232.

The input string—the sequence of key presses needed to call out the display of the desired character in the illustrative example, was 267#11.

If, instead, there been no display of the desired character in 222, the user would have pressed the # key, 315, in step 224 and, after determining in step 226 that the were more homophones to display, the display in 316 would have changed to show the characters of 506, with associated character-selection number keys, in step 220. If a homophone of the desired character was not seen in 506, the user again would have requested more homophones in step 224 and it would have been determined in step 226 that the characters of 510 and their associated character-selection number keys would be displayed in 316. And, if it now then been determined in step 226 that there were no more homophones to display, the process then would have moved to step 232 and stopped. The user could then consider entry of a different alternative character or consider whether the character entered as an alternative rhyming character might be a non-standard rhyme.

The 'non-standard rhyme' feature of the embodiment allows the user to be wrong in thinking that the desired character is a rhyme of the character selected for input as an alternative rhyming character; it allows the user to examine apparent rhymes arising from common pronunciation errors. One 'non-standard rhyme' input feature allows the user to input non-standard-rhyme characters as an aid to users having difficulty with standard Putonghua pronunciation, because of regional differences in Mandarin pronunciation, of which Putonghua is only one. Such speakers using this embodiment will be able to include in the display in step 208 rhymes of both the standard pronunciations and widely used regional pronunciations by pressing 313, the '8-key', in step 206— rather than the '7-key—to indicate entry of an alternative rhyming character. Other common, but non-regional, non-standard rhymes will be included in the display of 208 if the user presses 314, the '9-key', in step 206—rather than the '7-key—to indicate the entry of an alternative rhyming character. In another embodiment, a display of non-standard rhymes would exclude the standard rhymes. And in yet another embodiment, non-standard rhymes are displayed along with standard rhymes as a matter of course instead of using different keys for non-standard rhymes.

Rhymes are ranked on display in this embodiment according to their frequency of usage, from most frequent to least frequent. In familiar phrases or in words of more than one character, the display and rankings are altered according to characters that preceded the desired character in the word or phrase, since some characters never follow another in a word or familiar phrase, and those, that do, vary in the frequency with which they are used to follow the previous character; arranging such rankings are known to those skilled in the art.

In another embodiment, rhymes are ranked on display inversely according to their frequency of usage from least frequent to most frequent, since the less frequently used characters might be more pertinent for some users. In yet another embodiment, using techniques familiar to those skilled in the art, the ranking is constantly altered to reflect the frequency of usage of the user of the input device by keeping a record within, or accessible from, the device used for character input.

There are some characters which have more than one pronunciation in Putonghua. In some cases the pronunciations differ only in tone. But in a few cases, the pronunciations vary in the initial and/or final sounds. For example the character [扒]is pronounced 'bā' (as rendered in Pinyin spelling) when used to mean 'hold on to' but 'pá' (as rendered in Pinyin spelling) when used to mean 'rake up' or 'stew'. So, in another feature of the embodiment, non-phonetic entry of characters that are rhymes of either pronunciation will, after a press of 311, the '7-key', to indicate rhyme entry, bring a display that includes characters with a pronunciation that rhymes with the alternative rhyming character that was input.

In the example of 'bā' and 'pá, the character [扒]will be included after a press of 311 in the rhymes of an entered alternative rhyming character, regardless whether the alternative rhyming entry rhymed with 'bā' or with 'pá.

In another embodiment, the index characters indicate not groups of homophones, but only groups of characters with identical phonetic spellings, which usually includes in the index group some characters pronounced in Putonghua tones that differ from other characters. In this embodiment the desired character is selected from among the entire indexed group, regardless of tone; in a variation on this embodiment the desired tone also is entered in order to narrow—in most cases—the number of characters among which the user must search for the desired character.

The differences in Chinese dialects are said to be as significant as the differences between French and Italian. Since the national language policy is focused on reducing the communication problems this can create, students in school are taught Putonghua in all parts of the country. Yet pronunciation of Putonghua naturally varies somewhat according to locale, creating problems for phonetic computer-input of text.

Besides helping those users who can not remember the look of a needed character, the invention relieves yet a further complication for those who want to input Chinese. While the illustrations used heretofore are concerned with Putonghua (Beijing Mandarin), it is also useful to apply the method to rhymes from Chinese dialects other than Beijing Mandarin, including Wu, Yue (Cantonese), Xiang, Min, Hakka and Gan. Since the various dialects all make use of the same characters, non-phonetic input of a character is unaffected by the spoken dialect, and, consequently, other embodiments of the invention can include rhymes of Chinese dialects other than Putonghua.

In other embodiments rhymes for any number of dialects or languages are added to the database, including an embodiment in which the primary, or even the only, rhyme capability is in a dialect other than Beijing Mandarin (Putonghua). In one embodiment of the invention, the database is constructed so that the user can rely on the similar sounds of characters in the user's own dialect, rather than having to depend solely on his/her ability to pronounce Putonghua properly. This can be expected to call out a set of rhyming characters appropriate to the user's dialect. In a 'dialect' embodiment where both Putonghua pronunciation and that of a second dialect are made available, access of the different dialect's rhyme characters is accomplished in a reduced keyboard embodiment by pressing a designated rhyme key on the reduced keyboard twice then selecting the dialect prior to entering the rhyme character. In one such embodiment, a user whose native tongue is Yue and who does not have complete confidence in his Mandarin can use Yue rhymes by following input of an alternative rhyme character entry with an indication that it was not a Putonghua rhyme that was entered but a Yue rhyme, and Yue rhymes will be displayed for selection.

In a phonetic-input embodiment using the reduced keyboard of FIG. 3 and the computer configuration of FIG. 1, the reduced keyboard is used to enter the final of the desired character, which results in a display of rhyming index characters. The user enters the final of the desired character by pressing the key on which the first Pinyin letter of the final is seen on the standard reduced keyboard. Finals beginning with 'a' are accessed from the 2-key, those starting with 'e' are accessed from the 3-key, those starting with 'i' are accessed from the 4-key; those starting with 'o' are accessed from the 6-key and those starting with 'u' are accessed from the 8-key. In an example, if the user wants a final whose pronunciation is rendered in Pinyin as 'an', the user presses the 2-key and sees in a Pinyin display of finals 'a', 'ai', 'an', 'ang, and 'ao'. In order to encourage users who might be unsure of the pronunciation of the final as shown in Pinyin, each of these Pinyin-rendered finals also has a character displayed beside it which has the indicated final. The selection of 'an' brings a display of index characters whose finals are 'an', and which are pronounced with the level (first) tone, rendered in Pinyin as 'ān'. If one of the displayed index characters is the desired character, the user selects it; if not, the user selects an index character that exhibits not only a rhyming final, but also the appropriate initial. If the selected index character has the appropriate tone, the user requests display of more characters until (a homophone) a character with the same 'initial', 'final' and tone is displayed. If the character then displayed is the desired character, the user selects it and sends it to the text line. If, however, the index character with the desired final did not have the desired tone, the user successively requests index characters with each of the three other tones until an index character with the desired 'initial', 'final' and tone are displayed, among which will be the desired character. In another embodiment, the user enters the needed tone. In another embodiment, initial and final are entered using the alphabetic keycaps of Pinyin. The method can be used with other phonetic inputs of Chinese, including BOPOMOFO.

In one phonetic embodiment, entry of an initial and/or final is followed by the sound of the initial or final which is generated from a voice file using an electronic speaker available in the hardware of the text entry device. In embodiments where entry of the initial and final are followed by entry of the tone of the desired character, the sounds are sequentially the same as those used in 'spelling' Chinese characters aloud—pronunciation of the initial, followed by pronunciation of the final usually using the first tone, then pronouncing the entire character using the appropriate tone.

As understood by those skilled in the art, it is also possible in another embodiment to allow the user to precede input with the indication of alternative rhyme input, rather than to make the indication following input.

In yet another embodiment, the index characters indicate not just homophone groups but all characters with the same Pinyin spelling as that of the entered alternative rhyming character and tone differences are disregarded.

In order to increase text entry speed, an experienced user may decide to use alternative rhyme entry as the usual entry method for characters which the user finds easier or faster to enter than the desired character. Alternative rhyme entry also can be used as a primary means of entry for some or all character entry by designating, in one embodiment, specific characters as the usual input method for each of the various syllables or each of the sounds that make up the syllables.

Other Device Embodiments

In one embodiment, characters are entered using a full keyboard, rather than with a reduced keyboard.

In another full-keyboard embodiment, one in which the keyboard is used for direct regular character entry, not simply alternative rhyming character entry, the user enters the initial and final of the desired character using keys that show the various sounds designated by appropriate characters as well as by alphabetic representation. The entry of the final is done by pressing a key whose final is the same as that of a rhyming character shown on the key that is pressed to indicate the final. The keys pressed for initial and final may be the same or different keys. Entry of initial and final is followed by entry of the tone of the desired character. In another embodiment, it is not necessary to add the tone; the user selects the character from among the characters displayed in frequency-of use order after entry of the initial and final. In another embodiment, entry of the initial and final are followed not by the entry of the tone but by the entry of the desired character's stroke categories entered in traditional stroke-order sequence until the desired character is displayed alone or until the user decides to select it from among those displayed. In yet another embodiment, regular Pinyin entry of the character is followed by entry of the desired character's stroke categories entered in traditional stroke order sequence until the desired character is displayed alone or until the user decides to select it from among those displayed.

Embodiments used with full keyboards—including the generation of sound—are capable also of being applied to reduced keyboards. Similarly, embodiments used with reduced keyboards are capable of being applied to full keyboards. Efficiencies will, in some cases, differ.

In another full-keyboard phonetic embodiment, the method of alternative input of non-standard rhymes also is useful for displaying other possible interpretations of phonetic input when the user realizes that he or she has entered a non-standard pronunciation.

In another embodiment, characters are entered not via a keyboard but by use of electronic devices for detecting and tracking movement, including the movements of a stylus, finger, hand, wand or electronic pen to make individual strokes or cursive or semi-cursive movement to construct a Chinese character. When the entry device includes an electronic surface, the indication that the entry is a rhyme of the desired character is accomplished by pressing a soft key on the electronic surface. Alternatively, in another embodiment, the indication that the entry is a rhyme of the desired character is done by a movement with the writing device that is different from movements made to enter strokes.

CONCLUSION

Input of rhymes or non-standard rhymes is one of several approaches to both regular and supplementary text input methods based on similarities between Chinese characters or Chinese words. Other similarities between characters or words, include meaning and character structure are also useful for Chinese character input. Some such similarities also are applicable between alphabetic languages as well as in relation to, or between, Chinese-character-based languages, including Japanese, Korean and both the simplified and traditional characters of Chinese written language. In one embodiment, a user can input an English word, then press a key to request a display of any Chinese words with the same or similar meaning.

The above description is illustrative only and is not limiting. The present invention is defined solely by the claims which follow and their full range of equivalents. It is intended that the following appended claims be interpreted as including all such alterations, modifications, permutations, and substitute equivalents as fall within the true spirit and scope of the present invention.

What is claimed is:

1. A method of Chinese text input whereby a user of a computer configured for non-phonetic input of Chinese characters who knows the pronunciation of a desired character can enter the desired Chinese character by using non-phonetic entry of a Chinese character that rhymes with the desired Chinese character, the method comprising:

grouping Chinese characters that rhyme and creating within these groups of Chinese characters that rhyme one or more sub-groups of one or more characters which not only rhyme but also share the same initial sound;

designating an index Chinese character for each of the one or more sub-groups of one or more Chinese characters which not only rhyme but also share the same initial sound;

receiving signals from a user input device indicating non-phonetic entry of a Chinese character by the user;

receiving an indication from the user via the user input device indicating that the Chinese character entered using non-phonetic entry is a rhyme of the desired Chinese character;

displaying on the computer, for user selection of an index character, the index Chinese character for each of the one or more sub-groups which not only rhyme with the entered character and the desired character but also share the same initial sound as the entered character and the desired character;

displaying on the computer the desired Chinese character for user selection from among one or more Chinese characters displayed as a result of the user having selected an index character; and wherein the user indicates that the entered character is a rhyme of the desired character prior to or after entering the rhyming character.

2. The method of Claim 1 wherein the non-phonetic entry is keyboard entry.

3. The method of Claim 1 wherein the non-phonetic entry is handwriting entry.

4. The method of claim 1 wherein the user indicates that the Chinese character entered is a rhyme of the desired character by pressing a key.

5. The method of claim 1 wherein the user indicates that the Chinese character entered is a rhyme of the desired character by making a handwriting movement.

6. The method of claim 1 the rhymes are rhymes of Putonghua pronunciation of Chinese characters.

7. The method of claim 1 wherein the rhymes are rhymes in Chinese dialects other than Putonghua, including Wu, Yue (Cantonese), Xiang, Min, Hakka and Gan.

8. The method of claim 1 wherein the user indicates that the entered character is a rhyme of the desired character prior to entering the rhyming character.

9. The method of claim 1 wherein the user indicates that the entered Chinese character is a rhyme of the desired character after entering the rhyming character.

10. The method of claim 1 wherein the Chinese characters grouped as rhymes include Chinese characters that are not standard rhymes of the desired Chinese character, but are often considered as such.

11. The method of claim 10 wherein the user accesses the Chinese characters that are not standard rhymes of the desired Chinese character by indicating that they are not standard rhymes of the desired Chinese character.

12. The method of claim wherein the one or more Chinese characters in each of the one or more sub-groups represented by index characters are Putonghua homophones.

13. The method of claim 1 wherein the Chinese characters in each of the one or more sub-groups represented by index characters are homophones found in Chinese dialects other than Putonghua, including Wu, Yue (Cantonese), Xiang, Mi Hakka and Gan.

14. A computer system including a display and an input device and configured for non-phonetic entry of Chinese characters whereby a user can use a method of non-phonetic entry to enter a character that rhymes with a desired character, the method comprising:

grouping Chinese characters that rhyme and creating within these groups of Chinese characters that rhyme one or more sub-groups of one or more characters which not only rhyme but also share the same initial sound;

designating an index Chinese character for each of the one or more sub-groups of one or more Chinese characters which not only rhyme but also share the same initial sound;

receiving signals from a user input device indicating non-phonetic entry of a Chinese character by the user;

receiving an indication from the user via the user input device indicating that the Chinese character entered using non-phonetic entry is a rhyme of the desired Chinese character;

displaying on the computer, for user selection of an index character, the index Chinese character for each of the one or more sub-groups which not only rhyme with the entered character and the desired character but also share the same initial sound as the entered character and the desired character;

displaying on the computer the desired Chinese character for user selection from among one or more Chinese characters displayed as a result of the user having selected an index character; and wherein the user indicates that the entered character is a rhyme of the desired character prior to or after entering the rhyming character.

15. The system of claim 14 wherein the input device is a keyboard.

16. The system of claim 15 wherein the keyboard is the 12-key reduced keyboard commonly found on mobile phones.

17. The system of claim 15 wherein the keyboard is a full keyboard including the keyboard commonly used for text entry on desktop computers.

18. The system of claim 14 wherein the input device is an electronic device capable of tracking handwriting movement.

* * * * *